United States Patent [19]

Holovka et al.

[11] 3,718,701

[45] Feb. 27, 1973

[54] PREPARATION OF MIXED UNSYMMETRICAL ETHERS

[75] Inventors: John M. Holovka, Englewood; Edward Hurley, Jr., Littleton, both of Colo.

[73] Assignee: Marathon Oil Company, Findlay, Ohio

[22] Filed: Feb. 18, 1970

[21] Appl. No.: 12,439

[52] U.S. Cl. ......260/611 R, 260/611 A, 260/614 AA
[51] Int. Cl............................................C07c 41/10
[58] Field of Search.....................................260/611, A, 614 A, 614 AA

[56] References Cited

UNITED STATES PATENTS

| | | | |
|---|---|---|---|
| 3,479,392 | 11/1969 | Stern et al. | 260/614 AA |
| 3,530,187 | 9/1970 | Shryne | 260/614 AA |
| 3,499,042 | 3/1970 | Smutny | 260/614 AA |
| 3,489,813 | 1/1970 | Dewhirst | 260/611 A |
| 2,480,940 | 9/1949 | Leum et al. | 260/614 A |
| 2,797,247 | 6/1957 | Keith | 260/614 A |
| 2,861,045 | 11/1958 | Langer | 260/614 A X |
| 2,922,822 | 1/1960 | Beach | 260/614 A |
| 2,891,999 | 6/1959 | Langer | 260/614 A |
| 3,547,982 | 12/1970 | Mckeon et al. | 260/611 A X |

OTHER PUBLICATIONS

Handbook of Chemistry & Physics, Chemical Rubber Co., Cleveland, Ohio, 44th Ed., 1962 pp. 638-641

Primary Examiner—Howard T. Mars
Attorney—Jack L. Hummel, Joseph C. Herring and Richard C. Willson, Jr.

[57] ABSTRACT

Salts of Group VIII, row 5 and 6, metals, e.g. ruthenium chloride, catalyze liquid phase homogenous catalysis reaction of alpha, alpha-disubstituted olefins with alcohols to produce mixed ethers. These ethers are widely used in the formation of resins, medicines, preservatives, dyes, plastics, solvents and chemical intermediates.

8 Claims, No Drawings

PREPARATION OF MIXED UNSYMMETRICAL ETHERS

BACKGROUND OF THE INVENTION

1. Field of the Invention

This invention relates to a method of producing mixed ethers from the reaction of alpha, alpha-disubstituted olefins and alcohols carried out in the presence of salts of ruthenium, platinum, palladium, rhodium, osmium, and iridium. Mixed ethers such as methyl-t-butyl ether and isopropyl-t-butyl ether are valuable, inter alia, in the preparation of resins, preservatives, solvents, medicines and chemical intermediates. A number of methods have been employed for the preparation of such ethers. Alcohols have been added to the more reactive alkenes under the influences of acid catalysts to form ethers, see Royals, J. Am. Chem. Soc., 71, 2568 (1949). Such reactions are largely restricted to the preparation of tert-alkyl ethers of primary alcohols, since only the more reactive alkenes and primary alcohols undergo the reaction. Secondary and tertiary alcohols do not react readily, Royals, Advanced Organic Chemistry, p. 380. Phenols undergo the reaction; phenol adds, for example, to isobutene to give t-butylphenyl ether.

The present invention describes a process for the preparation of mixed ethers from the reaction of olefins and alcohols in the presence of salts of ruthenium, platinum, palladium, rhodium, osmium and iridium.

2. Description of the Prior Art

Various catalysts have been used in the preparation of mixed ethers from the reaction of olefins and alcohols. The following references are useful in defining the scope of the prior art of catalyzing the reaction.

| Patent | Catalyst | Conditions |
|---|---|---|
| Belgian 612,388 | anion exchange resin | Autoclave −60°C |
| U.S. 2,480,940 | org. H-ion exchange catalyst | |
| British 652,809 | metal oxide + ⁻OH | Vapor-phase reaction |
| U.S. 2,720,547 | 80% $H_2SO_4$ | −18° to +20°C |
| U.S. 2,721,222 | conc. $H_2SO_4$ | Autoclave −1000°C |
| U.S. 2,544,392 | metal oxide or hydroxide | Vapor-phase reaction |
| U.S. 3,135,807 | $Pb_{12}PMO_{12}O_{30}$-$SiO_2$ | |

SUMMARY OF THE INVENTION

General Statement of the Invention

It has been found that alpha, alpha-disubstituted olefins may be conveniently reacted with alcohol, in an alcohol solution containing a soluble salt of ruthenium, palladium, platinum, rhodium, osmium and iridium to give mixed ethers. The general reaction is represented by:

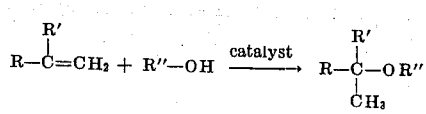

wherein R and R' are selected from phenyl groups, mono-, di-, and tri-alkyl substituted phenyl groups having one to 12 carbon atoms per alkyl substituent, alkyl and cycloalkyl groups having one to 12 carbon atoms, and R'' is selected from one to 12 carbon atom cycloalkyl and one to 12 carbon atom alkyl groups. Primary and secondary alcohols are preferred as starting materials with the primary being the most preferred alcohol species.

Utility of the Invention

The products of this invention are useful in improving the anti-knock qualities of fuels. See e.g., Chemical Abstracts 42:4735 and 4736.

DESCRIPTION OF THE PREFERRED EMBODIMENTS

Starting materials

The olefin starting materials of this invention are characterized by the structure

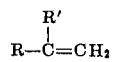

wherein R and R' are selected from phenyl groups, mono-, di-, and tri-alkyl substituted phenyl groups having one to 12 carbon atoms per alkyl substituent, alkyl and cycloalkyl groups having one to 12 carbon atoms. More preferably the alkyl groups have six or fewer carbon atoms and most preferably have three or fewer carbon atoms.

The number of alkyl groups substituted on a phenyl group is preferably three or less, more preferably two or less and most preferably one or zero. It is also preferred that there be no more than one phenyl ring substituted on the starting olefin.

The aromatic starting materials may include alpha-methylstyrene, alpha-phenylstyrene, alpha-ethylstyrene, and alpha-methyl-para-methylstyrene.

The linear or branched-chained olefin starting materials include such compounds as 2-methyl-1-butene, 2-ethyl-1-butene, 2,3-dimethyl-1-butene, and isobutylene. Other substituents may be present on the R and R' groups so long as they are substantially non-interfering with the conversion reaction.

The alcohol starting materials of this invention are characterized by the structure R''OH, wherein R'' is selected from linear or branched-chained alkyl groups having 12 or fewer carbon atoms. Preferably the alcohol is either the primary or secondary type with the primary alcohols being the most preferred species. Examples of such alcohols are methyl alcohol, ethyl alcohol, isopropyl alcohol, isobutyl alcohol, and butyl alcohol. The reactions of this invention are conducted in the liquid phase. The reaction is one of homogeneous catalysis, that is, where a catalyst, herein defined, is so dispersed within the reaction media that no gross interface exists between the catalyst and the reactants.

Catalysts

The catalysts of the present invention include the salts of ruthenium, palladium, platinum, rhodium, osmium, and iridium which at least partially solubilize, preferably to a substantial degree, in the reaction media to give an active catalyst species.

Useful salts include salts of ruthenium exemplified by ruthenium chloride, osmium salts, exemplified by osmium ammonium chloride, osmium potassium chloride, and the like; rhodium salts exemplified by rhodium chloride, rhodium nitrate, rhodium sulfate, and the like; iridium salts exemplified by iridic bromide, iridic chloride, iridic iodide, and the like. Preferred salts are those of rhodium and ruthenium. The most preferred anions are the chlorides which are at least partially soluble in the reaction media.

For economic considerations it is important to recover the catalysts. This can be accomplished by contacting the reduced catalysts with any material whose redox potential is higher than that of the catalyst. For example, regeneration could be effected by contact with cupric chloride which is reduced to cuprous chloride. Cupric chloride is a preferred oxidant because of its ready availability and the ease of reoxidation from the cuprous to the cupric form. Reoxidation can be accomplished by contact with an oxidizing agent, e.g., oxygen, or more preferably, a mixture of oxygen and hydrochloric acid. Other conventional methods of regenerating the catalyst are useful for this invention and are meant to be incorporated within its scope.

Normally the amounts of catalysts are not critical to the reaction. Excess amounts of catalysts are not preferred because of economic considerations but in most instances for every mole of olefin starting material preferably from about 0.00001 to about 0.1 moles of catalysts are used, more preferably from about 0.0001 moles to about 0.05 moles and most preferably from about 0.001 to about 0.01 moles of catalysts are used.

The mole ratios of the olefins and alcohol starting materials are not critical to the conversion reaction but in most instances for every mole of olefin starting material preferably from about 0.01 to about 1000 moles of alcohol are used, more preferably from about 0.1 to about 100 moles, and most preferably from about 5 to about 15 moles of alcohol are used.

Temperature

The homogeneous catalysis reaction is preferably conducted in the range of from about 0 to about 350, more preferably from about 50 to about 250, and most preferably from about 75° to about 150°C. In general, the temperature will depend upon the particular reactants and catalyst employed as well as the pressure of the reaction. The temperature is preferably controlled so that the reactants remain substantially in the liquid phase.

Pressure

Generally the reaction is conducted in a sealed vessel under autogeneous pressure, although pressure may be supplied by external means and is not narrowly critical and preferably ranges from 0.01 to about 10,000, more preferably from 1 to about 1000, and most preferably from 1 to about 100 atmospheres.

Time

Reaction time is not narrowly critical and will vary with the reactants, temperature and catalyst employed, but is preferably from about 0.1 to about 500, and more preferably from about 1 to about 200, and most preferably from about 10 to about 100 hours.

Batch or continuous basis

While the examples of the present invention are described on a batch basis, it may, of course, be practiced on a continuous basis with continuous flows of starting materials into and withdrawal of products from the reactor.

Additives to the reactions

These reactions may be improved by carrying them out in the present of auxiliary ligands. For instance, it has been determined that auxiliary ligands, such as dichloroethylene, trichloroethylene or $\phi_3P$, do not interfere with the reaction. Moreover, in certain instances, the presence of one of these ligands increases the reaction rates and aids in preventing side reactions. A comparison of examples (1), (3), and (4) shown in the Table of Results indicates that higher conversions are obtained when dichloroethylene or $\phi_3P$ is present in the reaction mixture. Also, a comparison of examples (7) and (8) indicates that trichloroethylene has prevented the reduction of the catalyst from occurring via a side reaction.

Additional catalysts and/or solvents may be employed to enhance the rate of reaction and yield of products. Those skilled in the art will be familiar with such procedures.

In general, the reactions taught in this invention are carried out as follows: A 3 oz. Fischer-Porter combustion tube containing ca. 0.04 mole of the olefin, ca. 0.4 mole of the alcohol and 0.0003 mole of catalyst is equipped with a magnetic stirring bar and sealed. The tube is then immersed in an oil bath and stirred at a given temperature for the appropriate length of time needed to complete the reaction. The reaction mixtures are analyzed via gas chromatography, mass spectroscopy, nmr and ir. The products and the yields, including the molar distributions thereof, and the selectivities are indicated in the following Table of Results.

TABLE OF RESULTS

| Example number | Reactants, M | Catalyst, mM. | Time, hr. | Temp., °C. | Conversion, percent | Products, M | Notes |
|---|---|---|---|---|---|---|---|
| 1 | MeOH, 0.47; dichloroethylene, 0.05; isobutylene, 0.047. | RhCl$_3$·3 H$_2$O, 0.36 | 16 | 100 | ~100 | Methyl-t-butyl ether, 0.047 | Selectivity >98%. |
| 2 | MeOH, 0.655; isobutylene, 0.063 | RuCl$_3$·3 H$_2$O, 0.3 | 16 | 100 | 63 | Methyl-t-butyl ether, 0.037 | Do. |
| 3 | MeOH, 0.4; isobutylene, 0.039 | RhCl$_3$·3 H$_2$O, 0.33 | 16 | 100 | 83 | Methyl-t-butyl ether, 0.034 | Do. |
| 4 | MeOH, 0.525; isobutylene, 0.04; $\phi_3P$, 0.35 mM. | RhCl$_3$·3 H$_2$O, 0.35 | 16 | 100 | ~100 | Methyl-t-butyl ether, 0.04 | Selectivity >98%, partial reduction Rh$^{+3}$ to Rh$^0$. |
| 5 | IPA, 0.26; isobutylene, 0.04 | RhCl$_3$·3 H$_2$O, 0.34 | 67 | 100 | ~50 | Isopropyl-t-butyl ether, 0.019; acetone, trace unknowns, 0.001. | Selectivity >95% Rh$^{+3}$ to Rh$^0$. |
| 6 | IPA, 0.248; trichloroethylene, 0.0613; isobutylene, 0.0517. | RhCl$_3$·3 H$_2$O, 0.34 | 72 | 100 | ~60 | Isopropyl-t-butyl ether, 0.02; acetone, trace. | Do. |
| 7 | MeOH, 0.431; α-methylstyrene, 0.03 | RhCl$_3$·3 H$_2$O, 0.34 | 18.5 | 100 | 37 | 2-phenyl-2-methoxy propane, 0.011. | Do. |
| 8 | MeOH, 0.283; α-methylstyrene, 0.034; trichloroethylene, 0.039. | RhCl$_3$·3 H$_2$O, 0.35 | 18.5 | 100 | 41 | 2-phenyl-2-methoxy propane, 0.014. | Selectivity >95%, no reduction of Rh$^{+3}$. |
| 9 | MeOH, 0.47; dichloroethylene, 0.05; isobutylene, 0.044. | None | 16.0 | 100 | 0 | No reaction | | a Mole percent.
All reactions were run in Fischer-Porter combustion tubes. The products were analyzed by nmr, ir, mass spectroscopy and gas chromatography "~" means approximately.

Having thus disclosed the invention, what is claimed is:

1. In a process for the preparation of mixed ethers by the liquid phase homogeneously catalyzed reaction of an olefin having the structure:

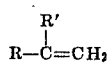

with alcohol having the structure R"OH to form

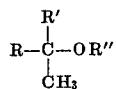

wherein R and R' are selected from phenyl groups, mono-, di-, and tri-alkyl substituted phenyl groups having one to 12 carbon atoms per alkyl substituent, alkyl and cycloalkyl groups having one to 12 carbon atoms, and R" is selected from one to 12 carbon atom cycloalkyl and one to 12 carbon atom alkyl groups, the improvement comprising conducting the reaction in the liquid phase at a temperature of from about 0° to about 350°C. and at a pressure of from about 1 to about 10,000 atmospheres in the presence of a catalytic amount of a homogeneous catalyst selected from chlorides of ruthenium, osmium, rhodium, iridium, palladium, and platinum, dissolved in the reaction mixture, and in the presence of from about 5 to about 15 moles of alcohol per mole of olefin, and from about 0.0001 to about 0.01 mole of catalyst are present per mole of olefin.

2. The process of claim 1 wherein the reaction is carried out in the presence of auxiliary ligands selected from the group consisting of dichloroethylene, trichloroethylene or $\phi_3 P$.

3. The process of claim 1 wherein the alkyl groups have six or fewer carbon atoms.

4. The process of claim 3 wherein the olefin is isobutylene or alpha-methylstyrene.

5. The process of claim 1 wherein R" is selected from one to 12 carbon atom cycloalkyl and one to 12 carbon atom alkyl groups.

6. The process of claim 5 wherein the R"OH is a primary or secondary alcohol.

7. The process of claim 5 wherein the R"OH is methyl alcohol or isopropyl alcohol.

8. The process of claim 1 wherein the catalyst is rhodium chloride.

* * * * *